E. H. PECK.
Joiners' Clamps.

No. 151,909.            Patented June 9, 1874.

Witnesses.
J. H. Shumway
A. J. Tibbits

Eugene H. Peck
Inventor
By Atty.
John S. Earle

UNITED STATES PATENT OFFICE.

EUGENE H. PECK, OF NEW HAVEN, CONNECTICUT.

IMPROVEMENT IN JOINERS' CLAMPS.

Specification forming part of Letters Patent No. 151,909, dated June 9, 1874; application filed March 18, 1874.

*To all whom it may concern:*

Be it known that I, EUGENE H. PECK, of New Haven, in the county of New Haven and State of Connecticut, have invented a new Improvement in Joiner's Clamp; and I do hereby declare the following, when taken in connection with the accompanying drawings and the letters of reference marked thereon, to be a full, clear, and exact description of the same, and which said drawings constitute part of this specification, and represent, in—

Figure 1:
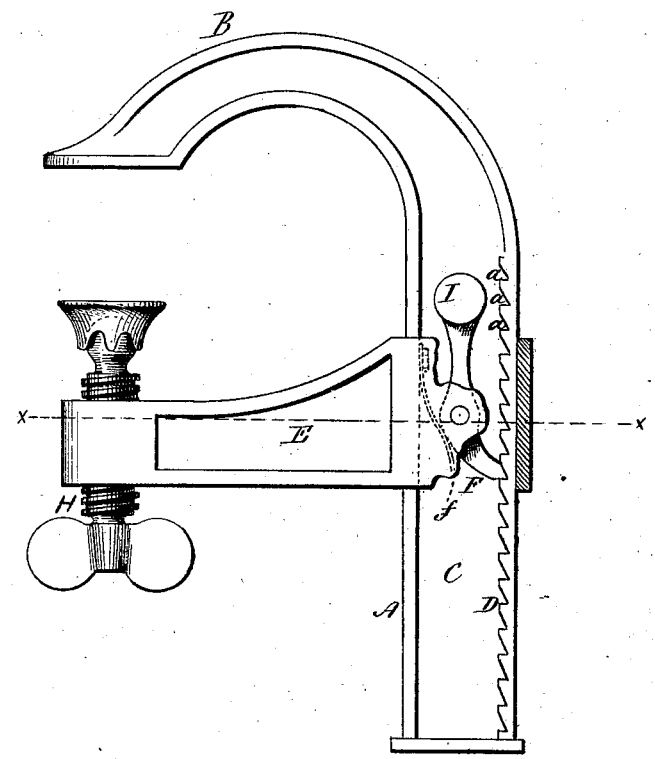
Figure 2:
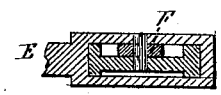

Figure 1, a side view, showing a portion of the movable arm in section; Fig. 2, a transverse section on line $x\ x$.

This invention relates to an improvement in the device known as a joiner's clamp—that is, a bar with a fixed and an adjustable arm at right angles to the bar, one of said arms provided with a clamping-screw, by which to clamp articles between the two arms; and the invention consists in constructing the bar with a recess upon one side, and one side of said recess formed with a series of teeth, combined with a sliding arm, one end of which surrounds said bar, and incloses a spring-pawl lying within said recess, and pivoted to said arm, so as to swing in substantially the plane of the said arm, and engage the teeth on the side of said recess in the bar, as hereinafter described.

A is the bar, one end turned into a fixed arm, B, the said bar formed with a recess, C, upon one side; and upon the inside of one of the sides D of the said recess a series of teeth, $a$, is formed, as seen in Fig. 1. E is the movable arm, constructed with a mortise at one end to pass on over the bar, as seen in Fig. 2; and attached to the arm within the said mortise, and so as to lie in the recess in the bar, is a pawl, F, its axis or pivot transverse to the arm, so that it will vibrate in the same plane as the arm, and provided with a spring, $f$, (denoted in broken lines,) which will force the pawl to engage one of the teeth $a$, and when so engaged the arm is held at that point. The other end of the arm E is fitted with a screw, H, in line with the end of the arm B, as in other clamps. When any considerable adjustment is required, draw the pawl F from the teeth by bearing the handle I toward the teeth; then move the arm to the desired point, and allow the pawl to engage one of the teeth, as before.

I do not, broadly, claim a joiner's clamp in which the movable arm is provided with a pawl, and the bar with teeth for the adjustment of the arm, as such I am aware is not new, and may be seen in the patent of Edward A. Walker, July 8, 1873.

I claim as my invention—

As an article of manufacture, the herein-described joiner's clamp, consisting of the recessed bar A, constructed with teeth $a$ upon one side of said recess, and with the fixed arm B at one end, the movable arm E, one end of which surrounds the said bar, and the spring-pawl F, pivoted to the said arm and within the said recess, the said pawl provided with a handle, I, and the arm E fitted with a screw, H, all substantially as specified.

EUGENE H. PECK.

Witnesses:
A. J. TIBBITS,
J. H. SHUMWAY.